(12) United States Patent
Dettinger et al.

(10) Patent No.: US 8,650,152 B2
(45) Date of Patent: Feb. 11, 2014

(54) METHOD AND SYSTEM FOR MANAGING EXECUTION OF DATA DRIVEN WORKFLOWS

(75) Inventors: Richard D. Dettinger, Rochester, MN (US); Daniel P. Kolz, Rochester, MN (US); Richard J. Stevens, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 1794 days.

(21) Appl. No.: 10/857,722

(22) Filed: May 28, 2004

(65) Prior Publication Data

US 2006/0004749 A1    Jan. 5, 2006

(51) Int. Cl.
*G06F 17/00* (2006.01)

(52) U.S. Cl.
USPC ............ 707/608; 707/602; 707/603; 707/687

(58) Field of Classification Search
USPC .......................................................... 707/6
See application file for complete search history.

(56) References Cited

U.S. PATENT DOCUMENTS

| | | | | |
|---|---|---|---|---|
| 5,634,127 | A * | 5/1997 | Cloud et al. .................. | 719/313 |
| 5,774,661 | A * | 6/1998 | Chatterjee et al. ............ | 709/203 |
| 5,999,911 | A * | 12/1999 | Berg et al. ........................ | 705/9 |
| 6,006,193 | A * | 12/1999 | Gibson et al. ..................... | 705/8 |
| 6,278,977 | B1 * | 8/2001 | Agrawal et al. ................... | 705/7 |
| 6,415,297 | B1 * | 7/2002 | Leymann et al. ............. | 707/201 |
| 6,725,227 | B1 | 4/2004 | Li | |
| 6,832,201 | B1 * | 12/2004 | Leymann et al. .................. | 705/7 |
| 6,895,573 | B2 * | 5/2005 | Norgaard et al. ............. | 717/100 |
| 6,968,343 | B2 * | 11/2005 | Charisius et al. ............. | 707/102 |
| 2003/0004767 | A1 * | 1/2003 | Ohsaki ............................... | 705/7 |
| 2003/0023675 | A1 * | 1/2003 | Ouchi et al. .................. | 709/203 |
| 2003/0084016 | A1 * | 5/2003 | Norgaard et al. ............... | 706/60 |
| 2003/0233341 | A1 * | 12/2003 | Taylor et al. ...................... | 707/1 |
| 2003/0233374 | A1 * | 12/2003 | Spinola et al. ............. | 707/104.1 |
| 2004/0078258 | A1 * | 4/2004 | Schulz et al. ...................... | 705/9 |
| 2004/0078776 | A1 * | 4/2004 | Moon et al. ................... | 717/101 |
| 2004/0119752 | A1 * | 6/2004 | Beringer et al. .............. | 345/779 |
| 2004/0167795 | A1 * | 8/2004 | Tanaka et al. ..................... | 705/1 |
| 2004/0172445 | A1 * | 9/2004 | Singh et al. .................. | 709/200 |
| 2004/0187089 | A1 * | 9/2004 | Schulz .......................... | 717/101 |
| 2004/0230546 | A1 * | 11/2004 | Rogers ............................ | 706/47 |
| 2005/0043979 | A1 * | 2/2005 | Soares et al. ...................... | 705/7 |
| 2007/0179790 | A1 * | 8/2007 | Leitch et al. ...................... | 705/1 |

OTHER PUBLICATIONS

Reichert, Manfred, et al., "A Framework for Dynamic Changes in Workflow Management Systems", Eighth Int'l Workshop on Database and Expert Systems, Sep. 1-2, 1997, pp. 42-48.*

(Continued)

*Primary Examiner* — Robert Stevens
*Assistant Examiner* — Daniel Um
(74) *Attorney, Agent, or Firm* — Patterson & Sheridan, LLP

(57) ABSTRACT

Methods, articles of manufacture and systems for managing execution of workflows. One embodiment provides a computer-implemented method for managing execution of a data driven multi-step workflow. The method includes receiving input data for a step of the workflow and performing the step of the workflow on the input data to obtain a result set. Then, at least one rule is applied to the result set for determining whether one or more associated conditions are satisfied. The at least one rule defines the one or more associated conditions and an associated process. If the one or more associated conditions are satisfied, the associated process is performed on the result set.

7 Claims, 3 Drawing Sheets

(56) References Cited

OTHER PUBLICATIONS

Muth, Peter, et al., "Workflow History Management in Virtual Enterprises Using a Light-Weight Workflow Management System", RIDE-VE '99, Sydney, Australia, Mar. 23-24, 1999, pp. 148-155.*

Meng, Jie, et al., "Achieving Dynamic Inter-Organizational Workflow Management by Integrating Business Processes, Events and Rules", HICSS 2002, Big Island, HI, Jan. 7-10, 2002, pp. 181-190.*

Joeris, Gregor, et al., "Managing Evolving Workflow Specifications", CoopIS '98, New York, NY, Aug. 20-22, 1998, pp. 310-319.*

Zeng, Liangzhao, et al., "PLMflow—Dynamic Business Process Composition and Execution by Rule Inference", TES 2002 (LNCS 2444), Hong Kong, China, Aug. 23-24, 2002, pp. 141-150.*

Kappel, G., et al., "Coordination in Workflow Management Systems—A Rule-Based Approached", Lecture Notes in Computer Science, vol. 1364/1998, Springer, Berlin, © 1998, pp. 99-119.*

Kappel, G., et al., "Bottom-Up Design of Active Object-Oriented Databases", Communications of the ACM, vol. 44, No. 4, Apr. 2001, pp. 99-104.*

Dettinger et al., IBM U.S. Appl. No. 10/720,960, filed Nov. 24, 2003, "Dynamic Functional Module Availability".

Dettinger et al., IBM U.S. Appl. No. 10/720,963, filed Nov. 24, 2003, "Method for Invoking and Integrating Multiple Functional Modules".

* cited by examiner

METHOD AND SYSTEM FOR MANAGING EXECUTION OF DATA DRIVEN WORKFLOWS

CROSS-REFERENCE TO RELATED APPLICATIONS

The present invention is related to the commonly owned U.S. patent application Ser. No. 10/720,960, filed Nov. 24, 2003, entitled "Dynamic Functional Module Availability", and commonly owned U.S. patent application Ser. No. 10/720,963, filed Nov. 24, 2003, entitled "Method for Invoking and Integrating Multiple Functional Modules", which are hereby incorporated herein in their entirety.

BACKGROUND OF THE INVENTION

1. Field of the Invention

The present invention generally relates to data processing and, more particularly, to managing execution of data driven workflows.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application, the operating system or an end user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is the manner in which the data is processed prior to being presented to an end user. A number of software solutions support the use of multiple functional modules to process data as desired by the user, but management of such functional modules is difficult. For example, a query building tool may present the user with a list of functional modules that aid in building queries and analyzing query results. Often times, execution of numerous functional modules are needed to compile the data in the desired state. Unfortunately, the selected functional modules need to be invoked individually by the user. This can be a very inconvenient and inefficient process for invoking multiple functional modules.

Current workflow technology provides the ability to call multiple functional modules in a specified order. A workflow is a defined set of collective steps that are driven in a programmatic environment. Each step is associated with execution of a corresponding functional module in this environment based on processing of a previous step. The steps are well defined and connected by a specific process. The specific process is defined in the workflow by programmatic logic. An example of a workflow might be purchase order processing affecting production and warehouse management, payment discounts being fully exploited in the accounts payable process, and customer requests being completed on time because of complex quotation procedures.

One shortcoming of the current workflow technology is the management of data driven workflows. In a data driven workflow a given step is only connected to another step by the result set obtained upon execution of the given step, i.e., by the data itself. For instance, assume a workflow for auditing data, providing statistics, profiling and normalizing the data. Here, the different steps are not connected by specific processes. Thus, in order to connect these different steps with each other, a user would need to include corresponding programmatic logic in the workflow. This, however, requires knowledge of the internal processing of the workflow and depends heavily on user interaction. Furthermore, a significant amount of time can be required to create the programmatic logic.

Therefore, there is a need for an efficient technique for managing execution of data driven workflows.

SUMMARY OF THE INVENTION

The present invention generally provides methods, articles of manufacture and systems for managing execution of workflows and, more particularly, for managing execution of a data driven multi-step workflow.

One embodiment provides a computer-implemented method for managing execution of a data driven multi-step workflow. The method includes receiving input data for a step of the workflow and performing the step of the workflow on the input data to obtain a result set. Then, at least one rule is applied to the result set for determining whether one or more associated conditions are satisfied. The at least one rule defines the one or more associated conditions and an associated process. If the one or more associated conditions are satisfied, the associated process is performed on the result set.

Still another embodiment provides a computer readable medium containing a program which, when executed, performs an operation for managing execution of a data driven multi-step workflow. The operation includes receiving input data for a step of the workflow and performing the step of the workflow on the input data to obtain a result set. Then, at least one rule is applied to the result set for determining whether one or more associated conditions are satisfied. The at least one rule defines the one or more associated conditions and an associated process. If the one or more associated conditions are satisfied, the associated process is performed on the result set.

Still another embodiment provides a system including a set of workflows. Each workflow defines a set of collective steps to be performed in the system. The system further includes a workflow engine for executing a first one of the workflows to obtain a first result set. The system further includes an executable component configured to apply at least one rule to the first result set to determine whether one or more associated conditions are satisfied. If one or more associated conditions are satisfied, the executable component performs an associated process utilizing the result set as input. The one or more associated conditions and the associated process are defined by the rule.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
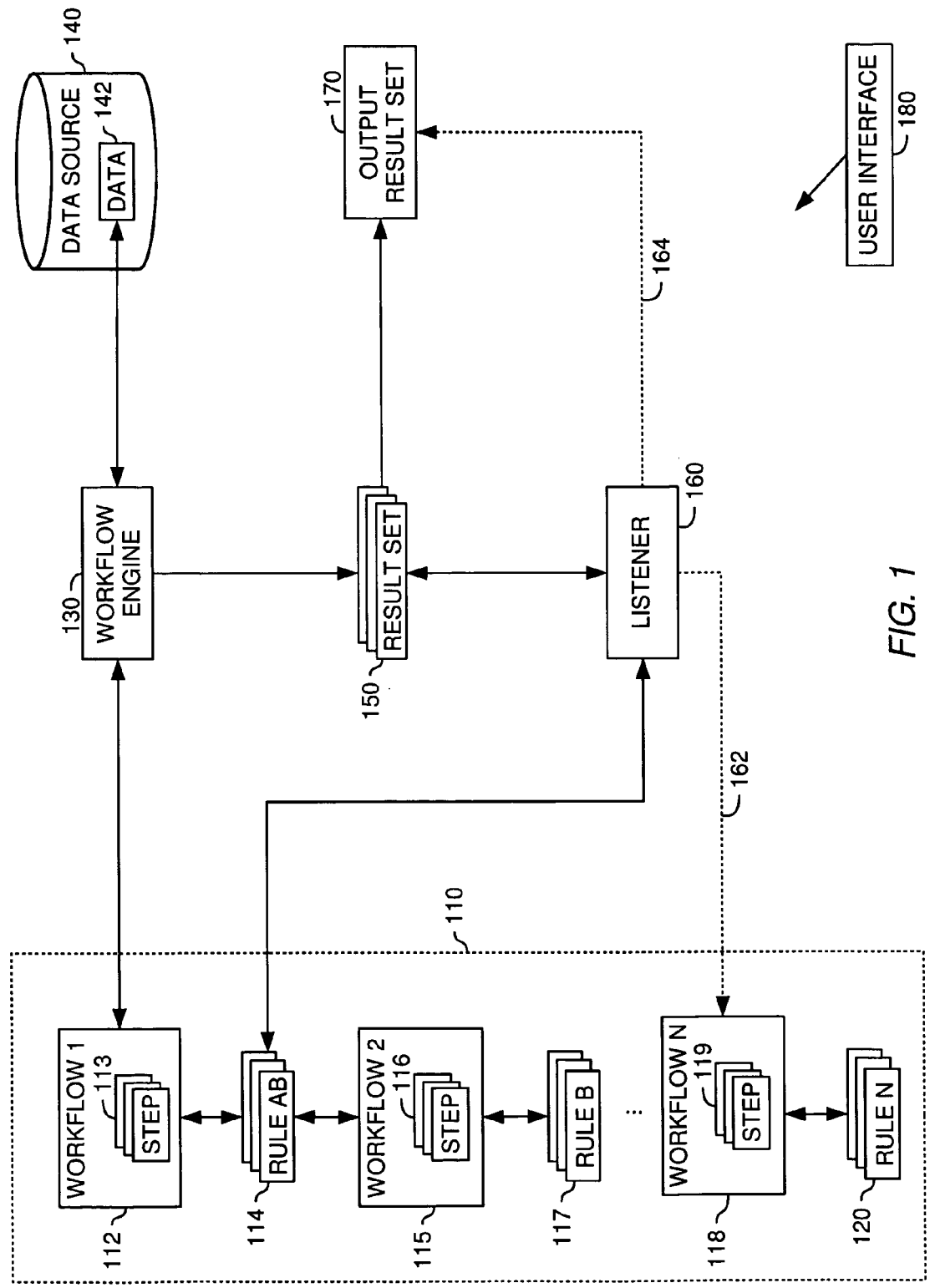
FIG. 1 is a relational view of components implementing one aspect of the invention.

The present invention generally is directed to methods, articles of manufacture and systems for managing execution of workflows and, more particularly, for managing execution of a data driven multi-step workflow. A workflow is a defined set of collective steps that are driven in a programmatic environment. A multi-step workflow is a workflow having a multiplicity of steps. Each step is associated with execution of a corresponding functional module in the programmatic environment based on processing of a previous step. A functional module generally refers to a set of coded instructions that enable a computer to perform a specified function. In a data driven multi-step workflow a given step is only connected to another step by the result set obtained upon execution of the given step, i.e., by the data itself.

In one embodiment, a workflow engine executes a given step of a multi-step workflow on corresponding input data. The input data can be provided from any entity requesting execution of the given step (e.g., an application, the operating system or an end user). Specifically, the input data can be a result set obtained for a previous step of the multi-step workflow. According to one aspect, the input data is data of a database and the given step consists in execution of a query against the data of the database. In response to the execution of the given step, a corresponding current result set is obtained. Then, at least one rule is applied to the current result set for determining whether one or more associated conditions are satisfied. According to one aspect, the at least one rule defines the one or more associated conditions and an associated process. The at least one rule can be applied to the current result set by a listener, which can be implemented separately from the workflow engine or as an integral part thereof. The listener determines whether the one or more associated conditions are satisfied. By way of example, determining whether the one or more associated conditions are satisfied may include determining whether the current result set includes a predefined type of data or determining whether the current result set includes data having a predefined value. If the one or more associated conditions are satisfied, the associated process is performed on the current result set. By way of example, the associated process can be a next sequential step in the multi-step workflow, another workflow or an operation including aborting the multi-step workflow and outputting the current result set.

In various embodiments, the invention provides numerous advantages over the prior art. For instance, in one embodiment a user can define all steps of a given multi-step workflow, define all rules associated with the steps, and schedule execution of the multi-step workflow as required. Then, during execution of the workflow, the output of each step is parsed and evaluated for rule satisfaction. Depending on each evaluation result, another workflow can be executed on the output. This procedure can be performed until all steps of the multi-step workflow and all other workflows are complete. Specifically, the output of each step of a given multi-step workflow may be associated with execution of a new workflow, regardless of whether the new workflow consists of one or many steps. Furthermore, a given rule may include multiple conditions which must be satisfied before execution of the new workflow. Moreover, parallel workflows can be associated with a single condition or with multiple conditions. In other words, each rule of a multiplicity of rules can be associated with invocation of a given workflow in parallel with multithreading or by inline processing. Alternatively, a single rule may be associated with invocation of multiple workflows, each having its own thread, or all forming one inline workflow.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer, although the client-server model is merely illustrative, and not limiting of the invention. Furthermore, embodiments of the present invention can apply to any comparable hardware configuration, regardless of whether the computer systems are complicated, multi-user computing apparatuses, single-user workstations, or network appliances that do not have non-volatile storage of their own.

Furthermore, embodiments of the invention can be described with reference to queries and, more particularly, to SQL queries. SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database. However, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

Moreover, embodiments of the invention can be described with reference to functional modules. Functional modules may be implemented internally or externally to a system, while remaining accessible by that system. Plug-in components, analysis routines, functions or programs among other terms may constitute functional modules. While a functional module may exist in any or all of these forms, to facilitate understanding, the term plug-in will be used to refer to any functional module described herein. The exact functions performed by the plug-ins may vary. For example, certain plug-ins may facilitate query building, while others provide printing support, or perform data analysis. While the following description focuses on selecting the subset of plug-ins related to an application designed for the building and initiating of a query, those skilled in the art will recognize that the methods described herein may be used with any applications that utilize plug-ins or other types of functional modules. Furthermore, it should be understood that by way of illustration reference is made to execution of plug-ins. However, execution of a plug-in should be understood as a synonym for execution of a step in a workflow.

A functional module can be associated with metadata. As used herein, the term metadata refers to descriptive information including the attributes of functional modules and result set data objects. Metadata associated with functional modules includes input requirements such as the number and type of required input and output (I/O) parameters and security requirements. Metadata may also comprise detailed information describing result sets returned from functional modules, such as column names, data types of columns, number of records returned, and content.

Further, as used herein, the term user may generally apply to any entity utilizing the data processing system described herein, such as a person (e.g., an individual) interacting with an application program or an application program itself, for example, performing automated tasks. While the following description may refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

An Exemplary Workflow Environment

Referring now to FIG. 1, a relational view of components implementing one aspect of the invention is illustrated. The components illustratively include a workflow repository 110, a workflow engine 130, a data source 140, a listener 160 and a user interface 180. The workflow engine 130 and the listener 160 are configured for managing execution of data driven workflows. Illustratively, the workflow manager 130 and the listener 160 are shown separate from each other. However, it should be noted that the workflow engine 130 and the listener 160 can be implemented together or that the listener 160 can be implemented as an integral part of the workflow engine 130. An exemplary method illustrating operation of the workflow engine 130 and the listener 160 for managing execution of a data driven multi-step workflow in one embodiment is described below with reference to FIGS. 3-4.

In one embodiment, the user interface 180 is configured for allowing user interaction with the workflow repository 110, the workflow engine 130, the data source 140 and the listener 160. For instance, the user interface 180 can be used for entering data, such as data 142, to be stored in the data source 140. The data source 140 is representative of any collection of data regardless of the particular physical representation. According to one aspect, the data source 140 represents a database and the data 142 represents objects within the database. For example, the data 142 may represent tables (and their respective contents) defined by columns and rows. By way of illustration, the data source 140 may be databases organized according to a relational schema (accessible by SQL queries) or according to an XML schema (accessible by XML queries). However, the invention is not limited to a particular physical representation or schema and contemplates extension to schemas presently unknown. As used herein, the term "schema" generically refers to a particular arrangement of data.

The user interface 180 may further be used for entering data used to define workflows. Thus, workflows contained in the workflow repository 110, such as exemplary workflows 112, 115 and 118, can be created. By way of example, each of the workflows 112, 115 and 118 is a data driven multi-step workflow. Each data driven multi-step workflow 112, 115 and 118 illustratively includes a multiplicity of steps 113, 116 and 119, respectively. Definitions of all steps 113, 116 and 119 composing the multi-step workflows 112, 115 and 118 can be entered using the user interface 180. For instance, a given step of one of the workflows 112, 115 or 118 can be defined by specifying a corresponding plug-in associated with the given step using the user interface 180. Furthermore, the user interface 180 can be used for defining a multiplicity of rules 114, 117 and 120. Each of the rules 114, 117 or 120 can be associated with one or more steps of one or more workflows. Illustratively, rule(s) 114 are associated with one or more steps 113 of the workflow 112 and one or more steps 116 of the workflow 115. Rule(s) 117 and 120 are associated with one or more steps of the workflows 115 and 118, respectively. An exemplary method for creation of a data driven multi-step workflow and associated rules in one embodiment is described below with reference to FIG. 2.

It should be noted that the workflow repository 110 is shown separate from the data source 140 in FIG. 1 and that only three exemplary workflows 112, 115 and 118 are illustrated in the workflow repository 110 for purposes of illustration. However, the workflow repository 110 can be stored at any appropriate location in a data processing system, including the data source 140. Furthermore, the three exemplary workflows 112, 115 and 118 are merely representative of a multiplicity of individual workflows which may be contained in the workflow repository 110. Moreover, providing the workflow repository 110 containing the multiplicity of individual workflows is merely illustrative and not intended for limiting the invention accordingly. The multiplicity of individual workflows contained in the workflow repository 110 may be provided separately from each other and stored individually at different locations in a corresponding data processing system.

The user interface 180 may further be used for entering queries to be executed against the data 142 in the data source 140. In one embodiment, a query is executed by a corresponding plug-in as a step of one of the workflows 112, 115 or 118. The corresponding plug-in is invoked by the workflow engine 130 for execution.

According to one aspect, a query that is executed against the data 142 is an abstract query. An abstract query is composed using logical fields defined by a data abstraction model. Each logical field is mapped to one or more physical entities of data of an underlying data representation being used in the data source 140 (e.g., XML, SQL, or other type representation). Furthermore, in the data abstraction model the logical fields are defined independently from the underlying data representation, thereby allowing queries to be formed that are loosely coupled to the underlying data representation. The abstract query can be configured to access the data 142 and return query results, or to modify (i.e., insert, delete or update) the data 142. For execution against the data 142, the abstract query is transformed into a form (referred to herein as a concrete query) consistent with the underlying data representation of the data 142. Transformation of abstract queries into concrete queries is described in detail in the commonly owned, co-pending U.S. patent application Ser. No. 10/083, 075, entitled "Application Portability And Extensibility Through Database Schema And Query Abstraction," filed Feb. 26, 2002.

According to one aspect, the workflow engine 130 manages execution of workflows from the workflow repository 110. Illustratively, the workflow engine 130 sequentially executes successive steps 113 of the data driven multi-step workflow 112 on the data 142. After execution of each step 113, a corresponding result set 150 is obtained from the data source 140. If a given step consists in execution of a query, the result set 150 represents a query result. Each obtained result set 150 is analyzed by the listener 160 for determining whether the result set 150 satisfies one or more conditions. To this end, the listener 160 applies a corresponding rule of the rules 114 that is associated with the workflow 112 to the result set 150. In one embodiment, the rule 114 defines the one or more conditions and an associated process. Illustratively, if after execution of a given step 113 the listener 160 determines that the corresponding result set 150 satisfies the condition(s), the listener 160 executes (as associated process) the step(s) 119 of the workflow 118 on the corresponding result set 150 (as illustrated by dashed arrow 162) or causes the workflow engine 130 to execute the workflow 118.

If, however, the listener 160 determines that the condition(s) is not satisfied, the listener 160 waits for a subsequent result set 150 obtained after execution of a next successive step 113 of the workflow 112. If the workflow 112 has completed execution and the condition(s) is not satisfied, the listener 160 outputs the result set 150 as output result set 170 (as illustrated by dashed arrow 164). Operation and interaction of the workflow engine 130 and the listener 160 are explained in more detail below with reference to FIGS. 2-4.

In one embodiment, the listener 160 includes a plurality of listener objects for evaluating the result set 150 according to the rule(s) 114. A given listener object can be created with reference to a particular step (e.g., one of steps 113) in the associated workflow 112 where they should be listening. Thus, modifying the associated workflow 112 itself can be avoided. More specifically, instead of modifying the associated workflow 112 to check output of the particular step against the rule(s) 114, the listener 160 can instruct the workflow engine 130 to transmit the result set 150 of the particular step to the listener 160. Then the result set 150 is analyzed as described above and if conditions determined from the rule(s) 114 are satisfied, an associated process defined by the rule(s) 114 can be started (e.g., workflow 118).

Creating a Data Driven Workflow

Figure 2:
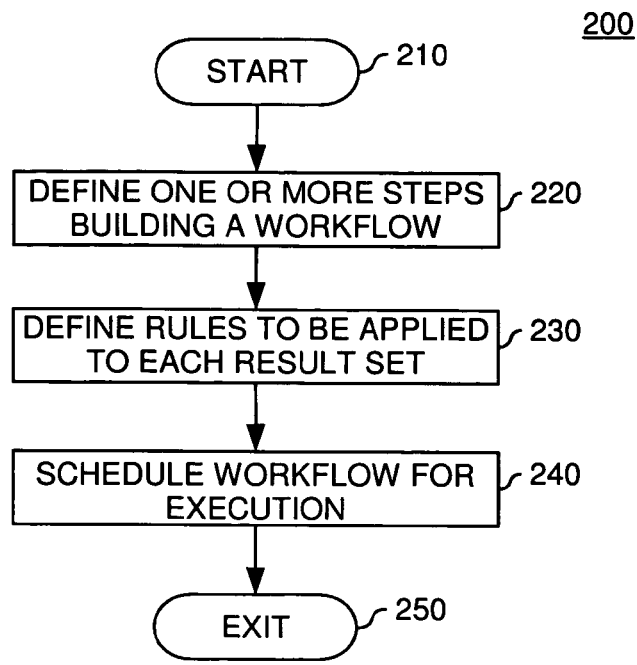
FIG. 2 is flow chart illustrating creation of a data driven multi-step workflow in one embodiment.

Referring now to FIG. 2, one embodiment of a method 200 for creating a data driven multi-step workflow (e.g., workflow 112, 115 or 118 of FIG. 1) and a plurality of associated rules (e.g., rules 114, 117 or 120 of FIG. 1) is shown. However, it should be noted that creation of a multi-step workflow is described by way of example and that method 200 may also be used for creation of a single-step workflow. At least part of the steps of method 200 can be performed using a user interface (e.g., user interface 180 of FIG. 1). Method 200 starts at step 210.

At step 220, all steps (e.g., steps 113, 116 or 119 of FIG. 1) building the data driven multi-step workflow are defined. In one embodiment, a given step of the multi-step workflow is defined by specifying an associated plug-in, such as a module for execution of a specific function or program. By way of example, a module for execution of a specific function or program may include an analysis routine, a query execution procedure or a data normalization program.

At step 230, all rules associated with result sets (e.g., result set(s) 150 of FIG. 1) of the steps building the data driven multi-step workflow are defined. In one embodiment, a rule associated with a given step of the multi-step workflow is defined by specifying one or more conditions to be satisfied by the result set of the given step and an associated process. By way of example, the condition(s) can be used to determine whether the result set of the given step includes a predefined type of data or data having at least one of (i) a predefined value, (ii) a value within a predefined range of values, and (iii) a character match. For instance, for a result set including data about individuals, one condition may require that the result set contains weight information for each individual. If the result set contains weight information, the associated process is executed. Another condition may require that the result set includes weight information indicating weights of more than 50 kg. In this case, the associated process may only be executed on data records of individuals weighting more than 50 kg. In other words, the associated process is executed at least on a part of the result set of the given step if the condition(s) is satisfied. By way of example, the associated process can be a next sequential step in the multi-step workflow, another workflow or an operation including aborting the multi-step workflow and outputting a current result set as output result set (e.g., output result set 170 of FIG. 1).

An exemplary rule template which can be used for defining the rules at step 230 can be expressed as illustrated in Table I below:

TABLE I

EXEMPLARY RULE TEMPLATE

Rule {Rule Name}
If {Conditions}
Run {Associated Process}

The exemplary rule template of Table I includes expressions in accolades which are replaced by corresponding definitions for an associated step of a given workflow. Illustratively, line 001 includes a "Rule" statement which uniquely identifies a corresponding rule using a {Rule Name}. This definition can be used for linking the rule to the associated step of the workflow. Line 002 includes an "If" clause defining the condition(s) {Conditions} of the rule. Line 003 includes a "Run" statement specifying an associated process {Associated process}. Use of this exemplary rule template for defining more specific rules is explained below with reference to FIGS. 3 and 4.

At step 240, the multi-step workflow is scheduled for execution. For instance, if it is assumed that execution of the multi-step workflow requires a large amount of a company's system resources, it can be scheduled for off-hours of the company. It should be noted that step 240 is optional and can be used for optimization of system resource usage. However, the multi-step workflow may also be invoked interactively at any time, e.g., in response to user input, or by a rule applied on a result set of a step of another workflow at runtime of the other workflow. Having defined (and possibly scheduled) a data-driven workflow, the method 200 then exits at step 250.

Figure 3:
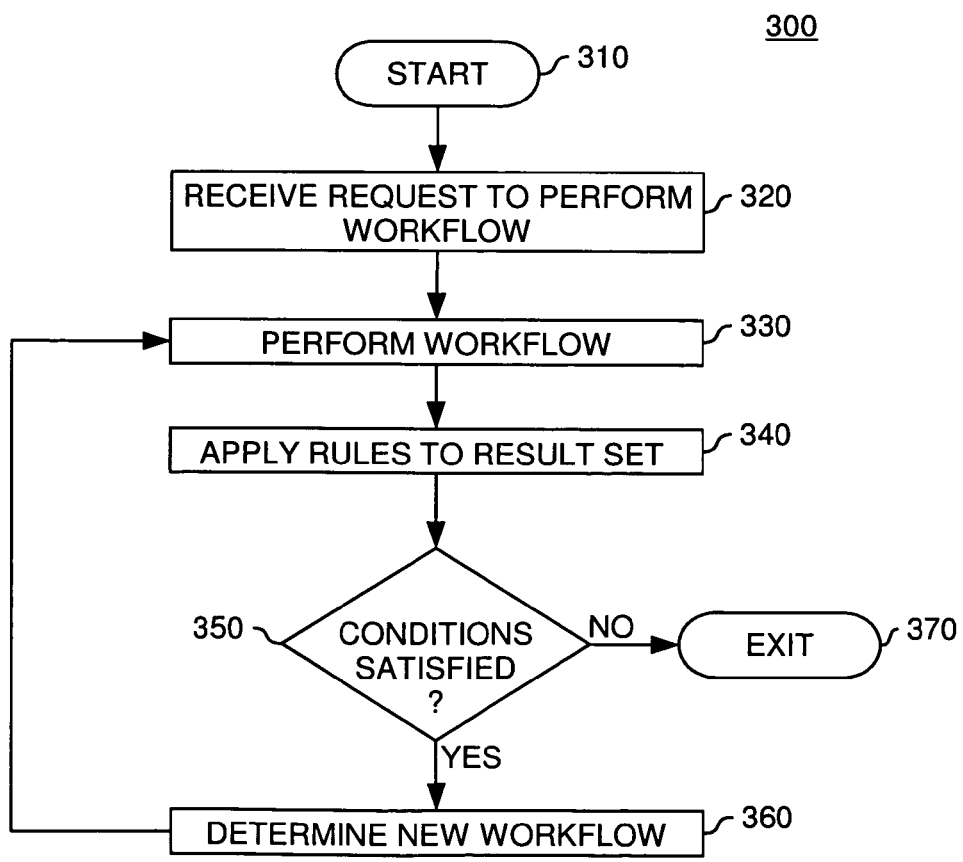
FIG. 3 is a flow chart illustrating a method for managing execution of a data driven multi-step workflow in one embodiment.

According to one aspect, the rules defined at step 230 can be used in managing execution of the associated data driven multi-step workflow defined at step 220. One embodiment of an exemplary method 300 for managing execution of data driven workflows (e.g., workflow 112, 115 or 118 of FIG. 1) is shown in FIG. 3. At least part of the steps of method 300 can be performed using a workflow engine (e.g., workflow engine 130 of FIG. 1) and/or a listener (e.g., listener 160 of FIG. 1).

Executing a Data Driven Workflow

For simplicity, method 300 is explained with respect to a data driven workflow having only one single step. Accordingly, reference is made hereinafter to execution of the workflow itself, for brevity. However, it should be noted that method 300 is suitable for execution of data driven multi-step workflows. In this case, instead of applying corresponding steps of method 300 to a complete workflow, i.e., to a single step of a single-step workflow, the corresponding method steps are applied to individual steps of the data driven multi-step workflows and corresponding result sets.

Method 300 starts at step 310. At step 320, a request for execution of a workflow (e.g., workflow 112 of FIG. 1) on input data (e.g., data 142 of FIG. 1) is received. For instance, using a user interface (e.g., user interface 180 of FIG. 1), a user can provide/specify the input data and select the workflow for execution thereon. One example of a selected workflow is a query that is executed against a database. At step 330, the workflow is executed and a corresponding result set (e.g., result set 150 of FIG. 1) is obtained. For instance, assume a medical environment where nurses and doctors using queries for accessing data about diagnosis of patients. By way of example, a given query can be executed against a database having information related to diseases. Upon execution of the given query, a corresponding query result is obtained.

At step 340, at least one rule (e.g., rule(s) 114 of FIG. 1) associated with the workflow is applied to the result set (e.g., by listener 160 of FIG. 1). At step 350, it is determined whether one or more conditions from the rule(s) is satisfied. If the condition(s) is not satisfied, method 300 exits at step 370. In this case, the result set can be outputted (e.g., as output result set 170 of FIG. 1).

If, however, the condition(s) is satisfied, an associated process is determined from the rule(s). Illustratively, the associated process is another workflow (e.g., workflow 118 of FIG. 1) which is determined from the at least one rule at step 360. The determined other workflow uses as input data the result set of the previously executed workflow. Processing then returns to step 330, where the determined other workflow is executed on the result set. Accordingly, steps 330, 340, 350 and 360 form a loop that is executed until all workflows, which can be determined at step 360, have been executed or until the determination at step 350 is not affirmative, so that method 300 exits at step 370.

In the given example, assume a researcher is performing a study on colon cancer. Assume further that the researcher applies a rule to each query result obtained upon execution of a query issued from the nurses and doctors. The rule includes a condition that filters data records relating to colon cancer diagnosis. In other words, the researcher is auditing all query results of queries on the database having information related to diseases for identifying patients having colon cancer diagnosis. An exemplary rule representing the rule is illustrated in Table II below. Illustratively, the exemplary rule has been created using the template rule illustrated in Table I.

TABLE II

EXEMPLARY RULE

Rule RESULTS_FROM_DISEASES
If Diagnosis='Colon Cancer'
Run WF_E-Mail-to-User

The exemplary rule includes a "Rule" statement in line 001 which indicates by way of example that the rule is applied to query results from the database table "DISEASES" having the information related to diseases ("RESULTS_FROM_DISEASES"). Line 002 includes an "If" clause defining a condition for filtering the data records from the query results having in a column "Diagnosis" an expression "Colon Cancer". Line 003 includes a "Run" statement specifying a workflow "WF_E-Mail-to-User" as associated process.

Assume now that the query result is in tabular form having a column related to patient IDs (PID) and another column having a diagnosis for each patient. Assume further that the query result includes a data record indicating that a patient having PID 1 is associated with a colon cancer diagnosis. As this data record satisfies the condition of line 002 of the exemplary rule of Table II, the "WF_E-Mail-to-User" workflow (line 003 of Table III) is started. The "WF_E-Mail-to-User" workflow may be started for sending an e-mail to the researcher for notifying the researcher that the patient having PID1 has been identified as a colon cancer patient.

Figure 4:
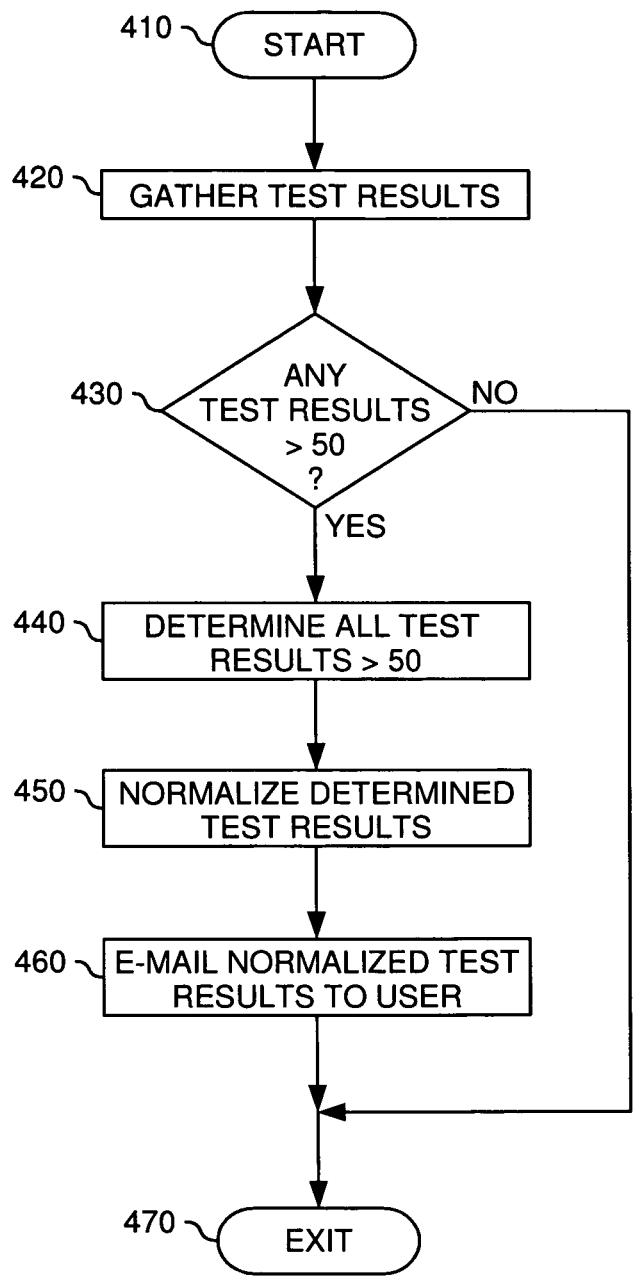
FIG. 4 is a flow chart illustrating exemplary operations for managing execution of a data driven multi-step workflow in one embodiment.

A more detailed example for managing execution of data driven workflows is explained in the following with reference to FIG. 4. FIG. 4 shows an exemplary method 400 illustrating application of a specific rule to a query result obtained from a data source (e.g., data source 140 of FIG. 1). For instance, assume that the query result is obtained upon execution of a query against a patient database in the example described above with reference to FIG. 3. The query may be intended to gather information related to patients having colon cancer diagnosis. Assume further that the query result includes personal information for such patients and test results for one or more medical tests. An exemplary table representing the query result is illustrated in Table III below:

TABLE III

EXEMPLARY QUERY RESULT

| PID | Test | Value | Personal Information |
|---|---|---|---|
| 1 | Test_a | 200 | ... |
| 2 | Test_a | 300 | ... |
| 3 | Test_a | 400 | ... |
| 4 | Test_b | 47 | ... |
| 5 | Test_a | 35 | ... |

The exemplary query result of Table III includes a plurality of result fields "PID", "Test", "Value" and "Personal Information" (line 001). Illustratively, the personal information has been represented as a single result field for brevity. However, it should be noted that the personal information can be represented by a multiplicity of result fields including, e.g., names, first names and addresses of patients. The test results include two result fields, the result field "Test" indicating a type of medical test which has been performed on a given patient and the result field "Value" indicating a value obtained in the medical test.

At least part of the steps of method 400 can be performed using a workflow engine (e.g., workflow engine 130 of FIG. 1) and/or a listener (e.g., listener 160 of FIG. 1). Method 400 starts at step 410.

At step 420, the test results are determined from the query result. Then, at step 430 the specific rule is applied to the query result for determining whether the determined test results satisfy an associated condition. For instance, assume that a researcher knows that one or more of the test result values have been determined using a measurement device which scales values to a specific standard which needs to be normalized for use by the researcher. Therefore, the associated condition is applied to the determined test results for determining whether a normalization of the test results is required. The specific rule having the associated condition is illustrated in Table IV below. Illustratively, the specific rule has been created using the template rule illustrated in Table I.

TABLE IV

SPECIFIC RULE

Rule FIELD_TEST_RESULTS
  If Test_a>50
    Run WF_Normalization

The specific rule of Table IV is applied to the result fields of the query result of Table III including the test results ("FIELD_TEST_RESULTS" in line 001 of Table IV). Specifically, the specific rule is used to determine data records from the query result of Table III for all patients having had a certain test result, i.e., a test "Test_a" (line 002 of Table IV) with a value greater than "50" (line 002 of Table IV). Furthermore, the specific rule indicates that a "WF_Normalization" workflow (line 003 of Table IV) is performed on the test results of all such determined data records. By way of example, the "WF_Normalization" workflow includes two steps: a first step for normalizing the test results and a second step for e-mailing the normalized test results to the researcher.

In the given example, it is determined at step 430 that the test results determined from the result fields "Test" and "Value" of the query result of Table III include "Test_a" test results having a value greater than 50. These data records are determined at step 440. More specifically, at step 440 the data records in lines 002-004 of Table III are determined.

At step 450, the first step of the "WF_Normalization" workflow (line 003 of Table IV) is executed on the test results. In other words, at step 450 the test results of the determined data records are normalized. Normalizing the test results may include multiplying the values of the test results with a predefined normalization factor. At step 460, the second step of the "WF_Normalization" workflow (line 003 of Table IV) is executed on the normalized test results. In other words, the normalized test results are send to the researcher via e-mail. Method 400 then exits at step 470.

It should be noted that sending the normalized test results to the researcher via e-mail has been described as second step of the "WF_Normalization" workflow by way of example. However, the sending step may also be part of another workflow. For instance, an auditing workflow may include a first step for querying the patient database and a second step for sending the query result to the researcher. In this case, upon execution of the first step of the auditing workflow, method 400 can be executed on the query result before executing the second step of the auditing workflow. Accordingly, only steps 420-450 of method 400 are executed on the query result for normalizing the test results included therein. The query result including normalized test results is then entered to the second step of the auditing workflow, where it is send to the researcher via e-mail. Therefore, it should be noted that such modifications to the illustrative flow charts of FIGS. 3-4 are broadly contemplated.

CONCLUSION

In various embodiments, the invention provides numerous advantages over the prior art. For instance, in one embodiment a data driven workflow and associated rules are defined. The workflow can be run interactively or scheduled. For instance, if the workflow requires significant system resources, scheduling the workflow for off-hours may be desired to improve productivity. Furthermore, the rules are saved once, but can be applied to any step of any workflow. Specifically, rules can be provided that are external from workflow steps. This allows rules to be added/removed according to user preferences without affecting runtime of a primary workflow, but could possibly affect whether a new workflow is started on output of the primary workflow. Moreover, the user can update rules with use of knowledge of internal processing of a corresponding workflow, but does not need to change programmatic logic in the corresponding workflow. This is opposed to conventional workflow processing where all conditional logic is embedded in the programmatic logic of the workflow steps.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing execution of a predefined data driven multi-step workflow, comprising:
    associating a rule with a step of the workflow, wherein the rule specifies one or more conditions;
    receiving input data for the step of the workflow, wherein the input data specifies a database query to be performed as the step of workflow;
    performing the step of the workflow by executing the database query to obtain a result set that includes a plurality of data elements from the database;
    prior to performing a next sequential step in the workflow, evaluating one or more of the plurality of data elements in the result set using the one or more conditions specified in the rule associated with the step of the workflow, wherein one of the conditions specified by the rule specifies data required in the result set in order to satisfy the condition;
    upon determining that one or more elements in the result set satisfy the one or more conditions, invoking a process associated with the rule, wherein the invoked process is configured to normalize each data element that satisfies the one or more conditions; and
    after invoking the associated process, performing a next sequential step in the multi-step workflow, wherein a next sequential step is passed the result set.

2. The method of claim 1, further comprising:
    performing the next sequential step in the multi-step workflow concurrently with invoking the associated process, wherein the next sequential step is passed the result set.

3. The method of claim 1, wherein determining whether the one or more conditions are satisfied comprises determining whether the result set includes a predefined type of data.

4. The method of claim 1, wherein determining whether the one or more conditions are satisfied comprises determining whether the result set includes data having at least one of:
    (i) a predefined value;
    (ii) a value within a predefined range of values; and
    (iii) a character match.

5. The method of claim 1, wherein the associated process comprises:
    aborting the multi-step workflow; and
    outputting the result set.

6. The method of claim 1, wherein one of the conditions specified by the rule specifies data required in the input data in order to satisfy the condition.

7. The method of claim 1, wherein the invoked process modifies at least one of the plurality of data elements of the result set before the result set is passed to the next sequential step in the multi-step workflow.

* * * * *